(12) United States Patent
Yao et al.

(10) Patent No.: US 11,194,133 B2
(45) Date of Patent: Dec. 7, 2021

(54) FOLDED LENS SYSTEM WITH FIVE REFRACTIVE LENSES

(71) Applicant: Apple Inc., Cupertino, CA (US)

(72) Inventors: Yuhong Yao, San Jose, CA (US); Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 16/593,895

(22) Filed: Oct. 4, 2019

(65) Prior Publication Data

US 2020/0033566 A1 Jan. 30, 2020

Related U.S. Application Data

(63) Continuation of application No. 15/472,134, filed on Mar. 28, 2017, now Pat. No. 10,437,022.

(60) Provisional application No. 62/314,350, filed on Mar. 28, 2016, provisional application No. 62/334,400, filed on May 10, 2016.

(51) Int. Cl.
 *G02B 13/00* (2006.01)
 *G02B 27/00* (2006.01)
(52) U.S. Cl.
 CPC ..... *G02B 13/0065* (2013.01); *G02B 13/0045* (2013.01); *G02B 27/0025* (2013.01)
(58) Field of Classification Search
 CPC .... G02B 13/004; G02B 13/02; G02B 13/002; H04N 5/2256
 USPC .......................... 348/291, 360, 208.11, 224.1
 See application file for complete search history.

(56) References Cited

U.S. PATENT DOCUMENTS

| | | | |
|---|---|---|---|
| 8,837,929 B2 | 9/2014 | Nomura et al. | |
| 8,958,163 B2 | 2/2015 | Chang et al. | |
| 2003/0011892 A1 | 1/2003 | Hall | |
| 2004/0247901 A1* | 12/2004 | Suzuki | G02B 1/14 428/451 |
| 2004/0257677 A1 | 12/2004 | Matsusaka | |
| 2006/0238882 A1* | 10/2006 | Hayashi | G02B 15/173 359/649 |
| 2007/0070525 A1 | 3/2007 | Taniyama | |
| 2009/0161235 A1 | 6/2009 | Border et al. | |
| 2010/0265363 A1 | 10/2010 | Kim | |
| 2013/0016433 A1 | 1/2013 | Ozaki et al. | |

(Continued)

FOREIGN PATENT DOCUMENTS

| | | |
|---|---|---|
| JP | 2006078854 | 3/2006 |
| WO | 2016011801 | 1/2016 |

*Primary Examiner* — Xi Wang
(74) *Attorney, Agent, or Firm* — Robert C. Kowert; Kowert, Hood, Munyon, Rankin & Goetzel, P.C.

(57) ABSTRACT

Compact folded lens systems are described that may be used in small form factor cameras. Lens systems are described that may include five lens elements with refractive power, with a light folding element such as a prism, located between a first lens element on the object side of the lens system and a second lens element, that redirects the light refracted from the first lens element from a first axis onto a second axis on which the other lens elements and a photosensor are arranged. The lens systems may include an aperture stop located behind the front vertex of the lens system, for example at the first lens element, and an optional infrared filter, for example located between the last lens element and a photosensor.

20 Claims, 10 Drawing Sheets

(56) References Cited

U.S. PATENT DOCUMENTS

2015/0253543 A1* 9/2015 Mercado ............ G02B 13/0065
348/370
2015/0253647 A1 9/2015 Mercado

* cited by examiner

FOLDED LENS SYSTEM WITH FIVE REFRACTIVE LENSES

PRIORITY INFORMATION

This application is a continuation U.S. patent application Ser. No. 15/472,134, filed Oct. 8, 2019, which claims benefit of priority of U.S. Provisional Application Ser. No. 62/314,350, filed Mar. 28, 2016, and also claims benefit of priority of U.S. Provisional Application Ser. No. 62/334,400, filed May 10, 2016, the content of which are incorporated by reference herein in their entirety.

BACKGROUND

Technical Field

This disclosure relates generally to camera systems, and more specifically to compact lens systems for high-resolution, small form factor camera systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor (also referred to as an image sensor) with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Compact folded lens systems are described that may be used in small form factor cameras. Lens systems are described that may include five lens elements with refractive power, with a light folding element such as a prism located between a first lens element on the object side of the lens system and a second lens element that redirects the light refracted from the first lens element from a first axis onto a second axis on which the other lens elements and a photosensor are arranged. The lens systems may include an aperture stop located behind the front vertex of the lens system, for example at the first lens element, and an optional infrared filter, for example located between the last lens element and a photosensor of the camera.

Embodiments of the compact folded lens system are described that include five lens elements with refractive power and a light folding element such as a prism to fold the optical axis. Embodiments of the compact folded lens system may provide a 35 mm equivalent focal length in the range of 50-85 mm and less than 6.5 mm of Z-height.

Through proper arrangement in materials, power and radius of curvature of the five lens elements with power, embodiments of the compact folded lens are capable of capturing high resolution, high quality images at low F/# operation. In some embodiments, a first lens element from the object side of the lens system has positive power, a second lens element has negative power, and a third lens element has positive power. In some embodiments, the first lens element has a convex object-side surface in the paraxial region. In some embodiments, a second lens element has a concave image-side surface in the paraxial region. In some embodiments, both the object-side and image-side surfaces of the second lens element are aspheric. In some embodiments, a third lens element has a convex object-side surface in the paraxial region. In some embodiments, a fifth lens element has a concave image-side surface in the paraxial region. In some embodiments, both the object-side and image-side surfaces of the fifth lens element are aspheric. In some embodiments, the first, third and fifth lens elements are formed of optical materials with Abbe number Vd>40, and the second lens element is formed of an optical material with Abbe number Vd<30. In some embodiments, the first, third and fifth lens elements are formed of optical materials with Abbe number Vd>40, and the second lens element is formed of an optical material with Abbe number Vd<35.

Figure 1:
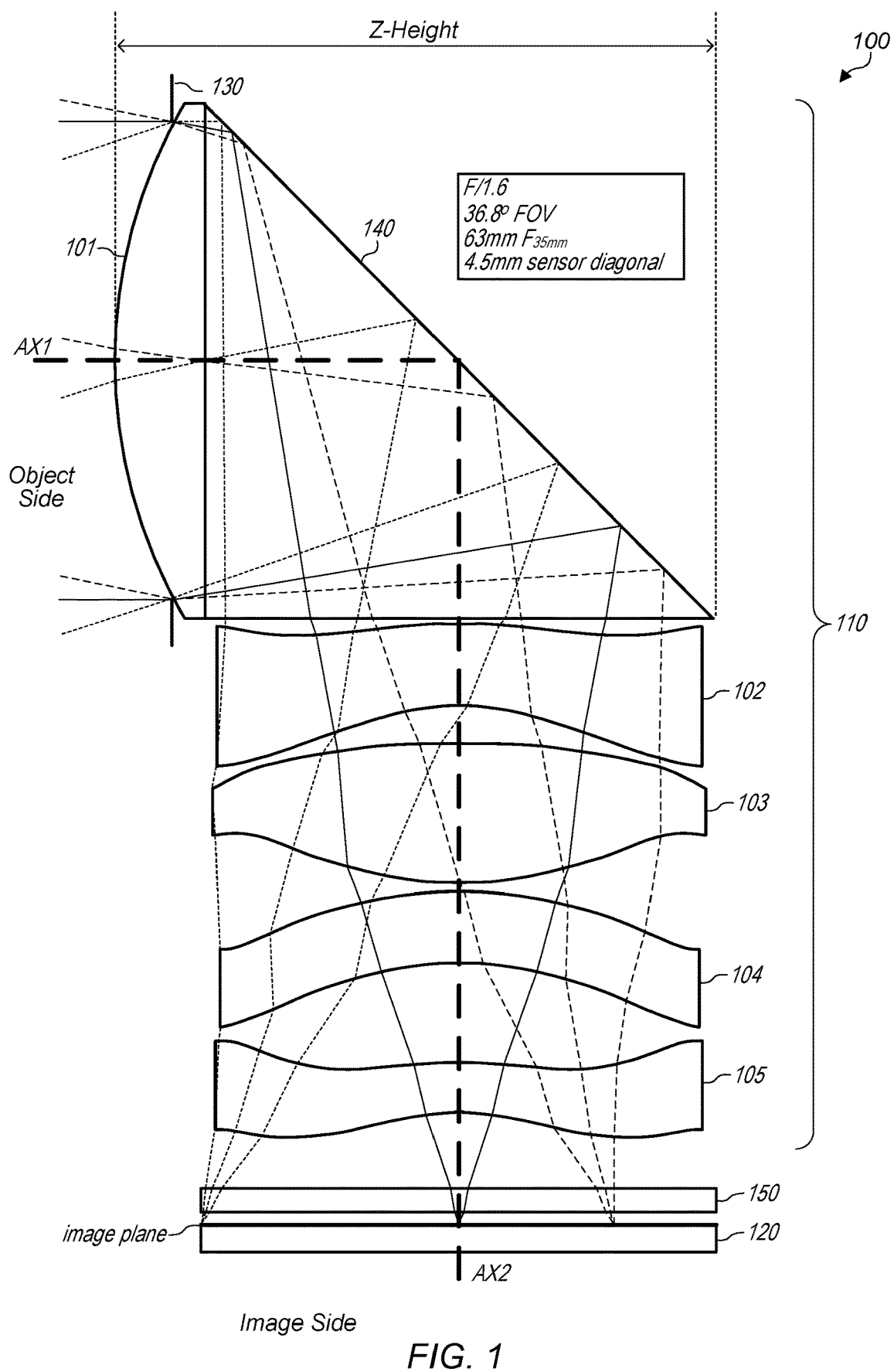
FIG. 1 is a cross-sectional illustration of a compact camera that includes an example embodiment of a compact folded lens system with five lens elements and a light folding element that operates at F/1.6, with 36.8° full field of view (FOV).

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact folded lens system including five lens elements with refractive power, with a light folding element such as a prism, located between a first lens element on the object side of the lens system and a second lens element, that redirects the light refracted from the first lens element from a first axis onto a second axis on which the other lens elements and a photosensor are arranged. The lens system may include an aperture stop located behind the front vertex of the lens system, for example at the first lens element, and an optional infrared filter, for example located between the last lens element and the photosensor. The shapes, materials, and arrangements of the lens elements in the lens system may be selected to capture high resolution, high quality images.

Conventionally, long focal length, compact imaging lenses can be designed with a non-folded optical axis that provide a 35 mm equivalent focal length ($f_{35\ mm}$) of 50 mm-70 mm. However, the lens brightness (related to the focal ratio, or F/#, of the lens system) and image quality of these conventional compact lens designs are typically limited by the constraint in thickness (Z dimension) of portable electronics devices. It is difficult to further increase the lens effective focal length of these conventional compact lens designs due to the scaling relationship with respect to the lens dimensions. To overcome this limitation, a folding-prism or mirror may be used in embodiments to relieve the constraint in the Z dimension of the lens system, enabling extension of the lens $f_{35\ mm}$ beyond the medium telephoto range.

A problem for conventional lens systems that operate in the telephoto range lies in the difficulty in scaling up the aperture size due to the difficulty in aberration control at large lens aperture. As a result, the focal ratio (F/#) of the lens systems is usually high. which leads to the following problems:

At a large focal ratio, brightness level of the imaging lens system is low (light flux captured by the imaging lens falls quadratically with increasing in F/#).

A large focal ratio leads to a small entrance pupil diameter (EPD), which limits the angular resolution of the lens system. (Being able to resolve distant objects with small angular extent is one of the prime functions of a lens system that operates in the telephoto range).

Embodiments of a compact folded lens system that include five lens elements with power and a folding prism to fold the optical axis are described that provide high brightness and high angular resolution in a compact lens system operating in the medium telephoto range. Embodiments of the compact folded lens system may provide a 35 mm equivalent focal length in the range of 50-85 mm and with less than 6.5 mm of Z-height to fit in a wide variety of portable electronics devices. With proper arrangement of materials, lens power and surface shapes, the lens system is capable of capturing high quality, high resolution images at low F/# operation.

Figure 7:
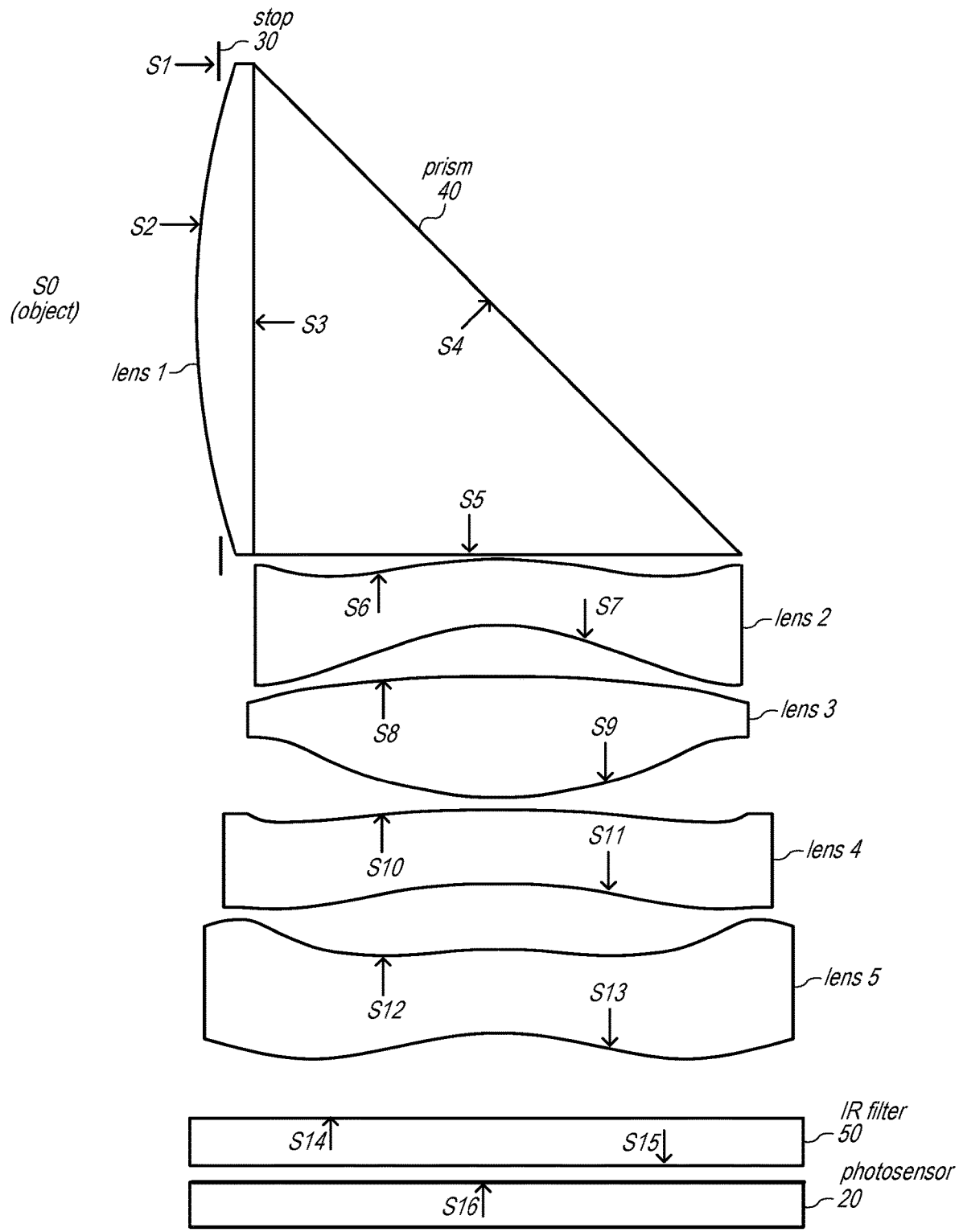
FIG. 7 illustrates numbering of the surfaces in the example lens systems as used in the Tables.

Embodiments of the compact folded lens systems as described herein may provide high resolution, high quality imaging for small form factor cameras. Using an embodiment of the compact lens system, a camera may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. FIG. 7 illustrates an example device that may include one or more small form factor cameras that use embodiments of the compact folded lens systems as described herein. However, note that aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

While embodiments of a compact folded lens system that includes five refractive lens elements are described herein, some embodiments may include one or more additional lens elements (and thus more than five lens elements) while achieving similar results.

Folded Lens Systems with Five Lens Elements

FIGS. 1 through 5 show several embodiments of compact cameras with compact folded lens systems that include five lens elements and a light folding element such as a prism that "folds" the optical axis of the lens system. A compact camera including an embodiment of the compact folded lens systems as illustrated in FIGS. 1 through 5 may, for example, be implemented in portable electronic devices such as mobile phones and tablets. The lens system and/or camera may also include an aperture stop, an optional infrared (IR) filter, and a photosensor. The compact folded lens systems as illustrated in FIGS. 1 through 5 may be configured to operate with a relatively narrow field of view and a 35 mm equivalent focal length ($f_{35\ mm}$) in the medium telephoto range. Compact cameras including the compact folded lens systems as illustrated in FIGS. 1 through 5 may, for example, be used stand-alone for telephoto photography, or can be paired with a wide-angle imaging lens in a dual-prime configuration to enable effective optical zoom for portable electronic devices.

A problem for conventional lens systems that operate in the telephoto range lies in the difficulty in scaling up the aperture size due to the difficulty in aberration control at large lens aperture. As a result, the focal ratio (F/#) of the lens systems is usually high. which leads to the following problems:

- At a large focal ratio, brightness level of the imaging lens system is low (light flux captured by the imaging lens falls quadratically with increasing in F/#).
- A large focal ratio leads to a small entrance pupil diameter (EPD), which limits the angular resolution of the lens system. (Being able to resolve distant objects with small angular extent is one of the prime functions of a lens system that operates in the telephoto range).

Embodiments of the compact folded lens system as illustrated in FIGS. 1 through 5 may include five lens elements with refractive power and a light folding element such as a prism to fold the optical axis. Embodiments of the compact folded lens system as illustrated in FIGS. 1 through 5 may provide a 35 mm equivalent focal length in the range of 50-85 mm and less than 6.5 mm of Z-height to fit in a wide variety of portable electronics devices. With proper arrangement of materials, lens power and surface shapes, embodiments of the compact folded lens system are capable of capturing high quality, high resolution images at low F/# operation.

Embodiments of the compact folded lens system as illustrated in FIGS. 1 through 5 may include five lens elements with refractive power and a folding element such as a prism, in order from the object side to the image side of the lens system: a first lens element with positive refractive power (lens 1), a folding element such as a prism to fold the optical axis from AX1 to AX2, a second lens element (lens 2) with negative refractive power, a third lens element (lens 3) with positive refractive power, a fourth lens element (lens 4) with refractive power, and a fifth lens element (lens 5) with refractive power. An aperture stop may be located between the object side of the optical system and the folding element. In some embodiments, the lens system or camera includes an infrared (IR) filter to reduce or eliminate interference of environmental noises on the image sensor (also referred to herein as a photosensor or sensor). In some embodiments, the photosensor may be shifted along AX2 to allow refocusing of the lens system in between Infinity conjugate and Macro conjugate, for example for autofocus applications. Lens 2, lens 3, lens 4, and lens 5 may be round/circular optical lenses, or may have a shape other than round (e.g., rectangular or square, hexagonal, etc.) to reduce the camera module Z-height.

In embodiments of the compact folded lens system as illustrated in FIGS. 1 through 5, one or more of the following requirements may be satisfied, for example to facilitate correction of aberrations across the field of view (FOV) for the lens system:

- Lens 1 has positive power, lens 2 has negative power, and Lens 3 has positive power.
- Lens 1 has a convex object-side surface in the paraxial region.
- Lens 3 has a convex image-side surface in the paraxial region
- Both the object-side and the image-side surface of lens 5 are aspheric.
- Lens 1 and lens 5 are formed of optical materials with Abbe number Vd>40, and lens 2 is formed of an optical material with Abbe number Vd<35.

In some embodiments, one or more of the following relationships may be met:

$$0.3<|f/f1|<1$$

$$0.5<|f/f2|<2$$

$$0.5<|f/f3|<2$$

where f is effective focal length of the lens system, f1 is focal length of lens 1, f2 is focal length of lens 2, and f3 is focal length of lens 3.

Figure 2A:
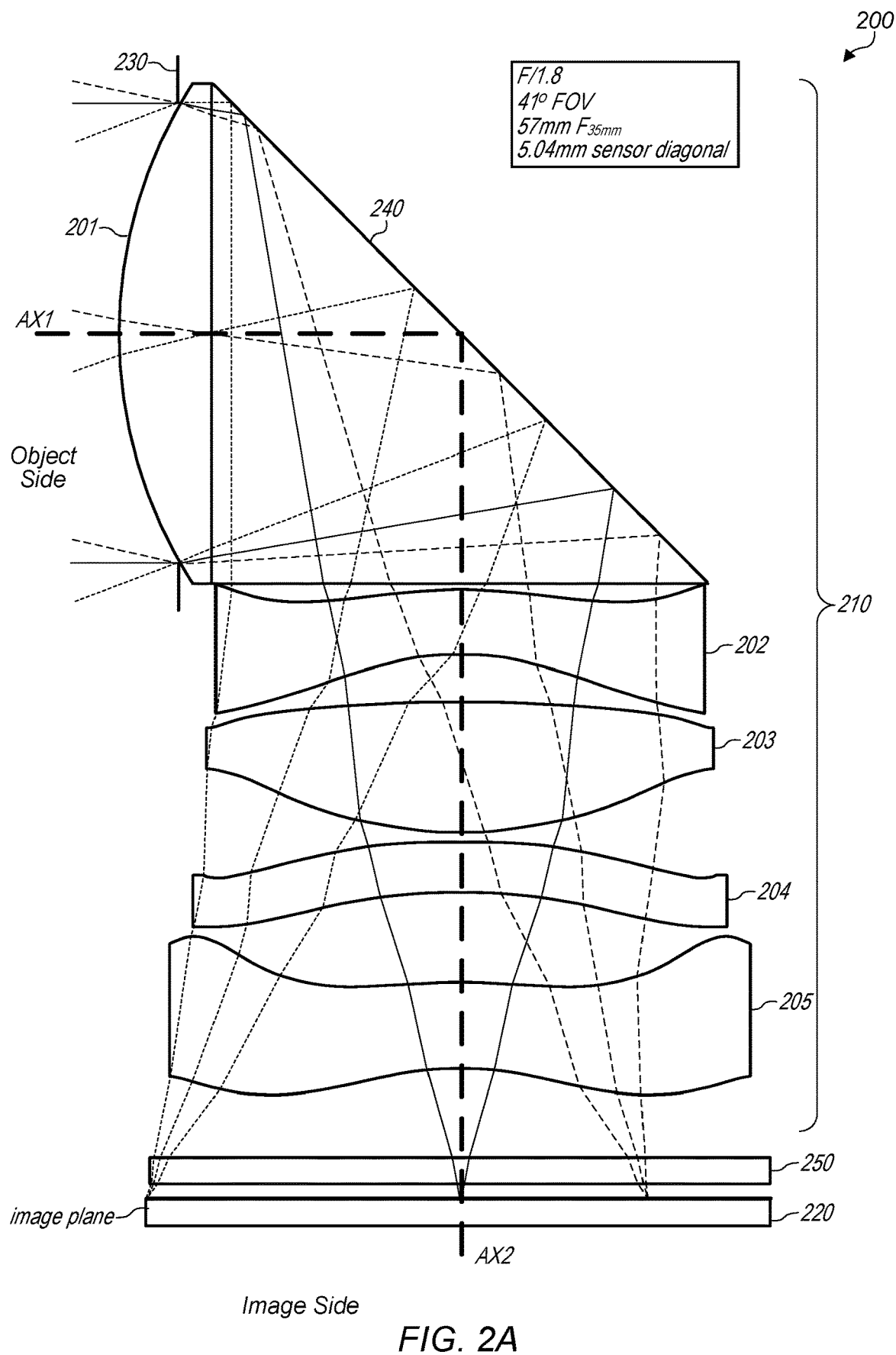
FIGS. 2A-2B show a camera that includes an example embodiment of a compact folded lens system that operates at F/1.8, with 41° full FOV.
Figure 2B:
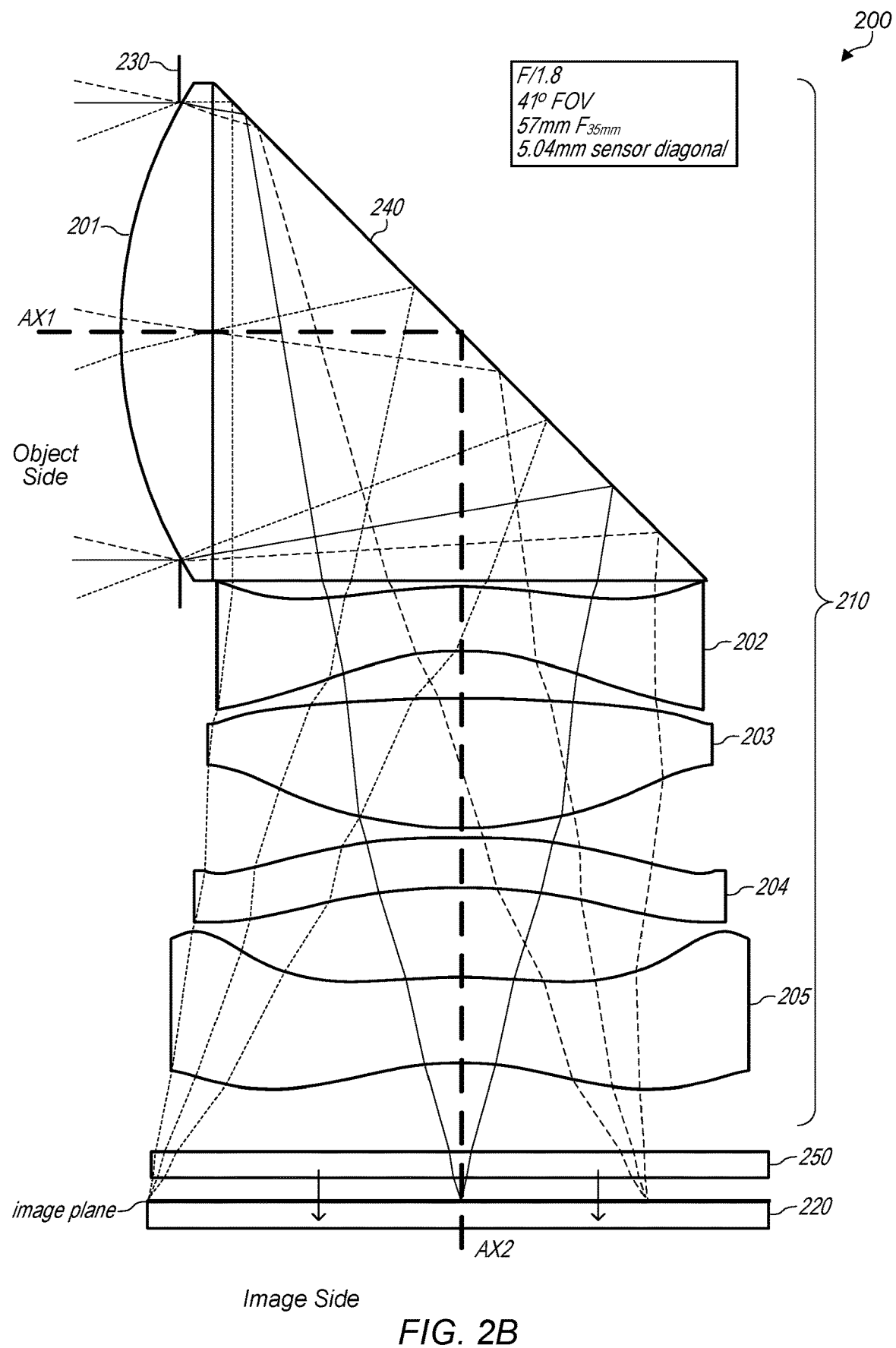

As shown in the example embodiment in FIGS. 2A-2B, in some embodiments of a camera including compact folded lens system as illustrated in FIGS. 1 through 5, the photosensor may be moved on one or more axes relative to the lens system to adjust focus of the camera. Alternatively, in some embodiments, the lens system may be moved relative to the photosensor to adjust focus. FIG. 2A corresponds to the camera focused at a first position (infinity conjugate), and FIG. 2B corresponds to the camera focused at a second position (e.g., macro conjugate). While the focus positions are shown as examples, note that the camera may be focused at other positions in some embodiments.

As shown in the example embodiments in FIGS. 1 through 5, in embodiments of a compact folded lens system as described herein, the image side surface of the first lens element (lens 1) may be flat/plano (e.g., lens 1 may be plano-convex), and the image side surface of lens 1 may be at/in contact with the object side surface of the light folding prism to effectively form a single combined unit or element. The lens 1 and prism elements may be composed of the same type of material (e.g., a plastic material) or of different types of materials. In some embodiments, the lens 1 and prism elements may be cemented. Alternatively, the lens 1 and prism elements may be composed of the same type of material (e.g., a plastic material), and may be molded as a single combined unit or element. However, while not shown in the example Figures, in some embodiments the image side surface of lens 1 may be convex, concave, or flat-plano, and lens 1 and the folding element (prism) may be air-spaced.

Example Lens System 110

FIG. 1 shows a camera 100 that includes an example embodiment of a compact folded lens system 110 that operates at F/1.6, with 36.8° full FOV. Camera 100 includes a 4.5 mm diagonal photosensor 120. Lens system 110 includes five lens elements with refractive power and a folding element such as a prism, in order from the object side to the image side of the lens system: a first lens element 101 with positive refractive power, a folding element 140 such as a prism to fold the optical axis from AX1 to AX2, a second lens element 102 with negative refractive power, a third lens element 103 with positive refractive power, a fourth lens element 104 with refractive power, and a fifth lens element 105 with refractive power. An aperture stop 130 may be located between the object side of the lens system 110 and the folding element 140, for example at or near the object side surface of lens element 101, for controlling the brightness of the optical system. In some embodiments, the lens system 110 or camera 100 includes an IR filter 150 to reduce or eliminate interference of environmental noises on the photosensor 120.

Tables 1-4 correspond to an embodiment of a lens system 110 as illustrated in FIG. 1, and provide example values for various optical and physical parameters of the lens system 110 and camera 100 of FIG. 1. The effective focal length (EFL) of the lens system 110 is 6.6 mm. Given the EFL and photosensor size, the 35 mm equivalent focal length of the camera 110 may be 63 mm. While not shown in FIG. 1, in some embodiments, the camera 100/lens system 110 has the capability of autofocusing from Macro to Infinity conjugates.

The modulation transfer function (MTF) for lens system 110 is higher than 0.5 at 250 lp/mm; the lens system 110 provides good contrast for high-resolution imaging. On-axis and off-axis aberrations for lens system 110 are well balanced across the FOV. Optical distortion across the FOV is controlled within 2%, while field curvature and astigmatism are well balanced across the FOV.

In some embodiments, Z-height of the example lens system 110, as defined from the front vertex of lens element 101 to the rear vertex of the folding element 140, may be 5.2 mm. The lens system 110 is able to fit into a wide variety of portable electronic devices including but not limited to smart phones and tablets.

Example Lens System 210

FIGS. 2A-2B show a camera 200 that includes an example embodiment of a compact folded lens system 210 that operates at F/1.8, with 41° full FOV. Camera 200 includes a 5.04 mm diagonal photosensor 220. Lens system 210 includes five lens elements with refractive power and a folding element such as a prism, in order from the object side to the image side of the lens system: a first lens element 201 with positive refractive power, a folding element 240 such as a prism to fold the optical axis from AX1 to AX2, a second lens element 202 with negative refractive power, a third lens element 203 with positive refractive power, a fourth lens element 204 with refractive power, and a fifth lens element 205 with refractive power. An aperture stop 230 may be located between the object side of the lens system 210 and the folding element 240, for example at or near the object side surface of lens element 201, for controlling the brightness of the optical system. In some embodiments, the lens system 210 or camera 200 includes an IR filter 250 to reduce or eliminate interference of environmental noises on the photosensor 220.

Tables 5-9 correspond to an embodiment of a lens system 210 as illustrated in FIGS. 2A-2B, and provide example values for various optical and physical parameters of the lens system 210 and camera 200 of FIGS. 2A-2B. The effective focal length (EFL) of the lens system 210 is 6.6 mm. Given the EFL and photosensor size, the 35 mm equivalent focal length of the camera 200 may be 57 mm. In some embodiments, the camera 200/lens system 210 has the capability of autofocusing from Macro to Infinity conjugates.

As shown in FIGS. 2A-2B, in some embodiments the photosensor 220 may be moved on one or more axes relative to the lens system 210 to adjust focus of the camera 200. FIG. 2A corresponds to the camera 200 focused at a first position (infinity conjugate), and FIG. 2B corresponds to the camera 200 focused at a second position (700 mm in FIG. 2B). While the focus positions are shown as examples, note that the camera 200 may be focused at other positions in some embodiments.

The modulation transfer functions (MTF) for lens system 210 are higher than 0.4 at 250 lp/mm; the lens system 210 provides good contrast for high-resolution imaging. On-axis and off-axis aberrations for lens system 210 are well balanced across the FOV. Optical distortion across the FOV is controlled within 2%, while field curvature and astigmatism are well balanced across the FOV.

In some embodiments, Z-height of the example lens system 210, as defined from the front vertex of lens element 201 to the rear vertex of the folding element 240, may be 4.75 mm. The lens system 210 is able to fit into a wide variety of portable electronic devices including but not limited to smart phones and tablets.

Example Lens System 310

Figure 3:
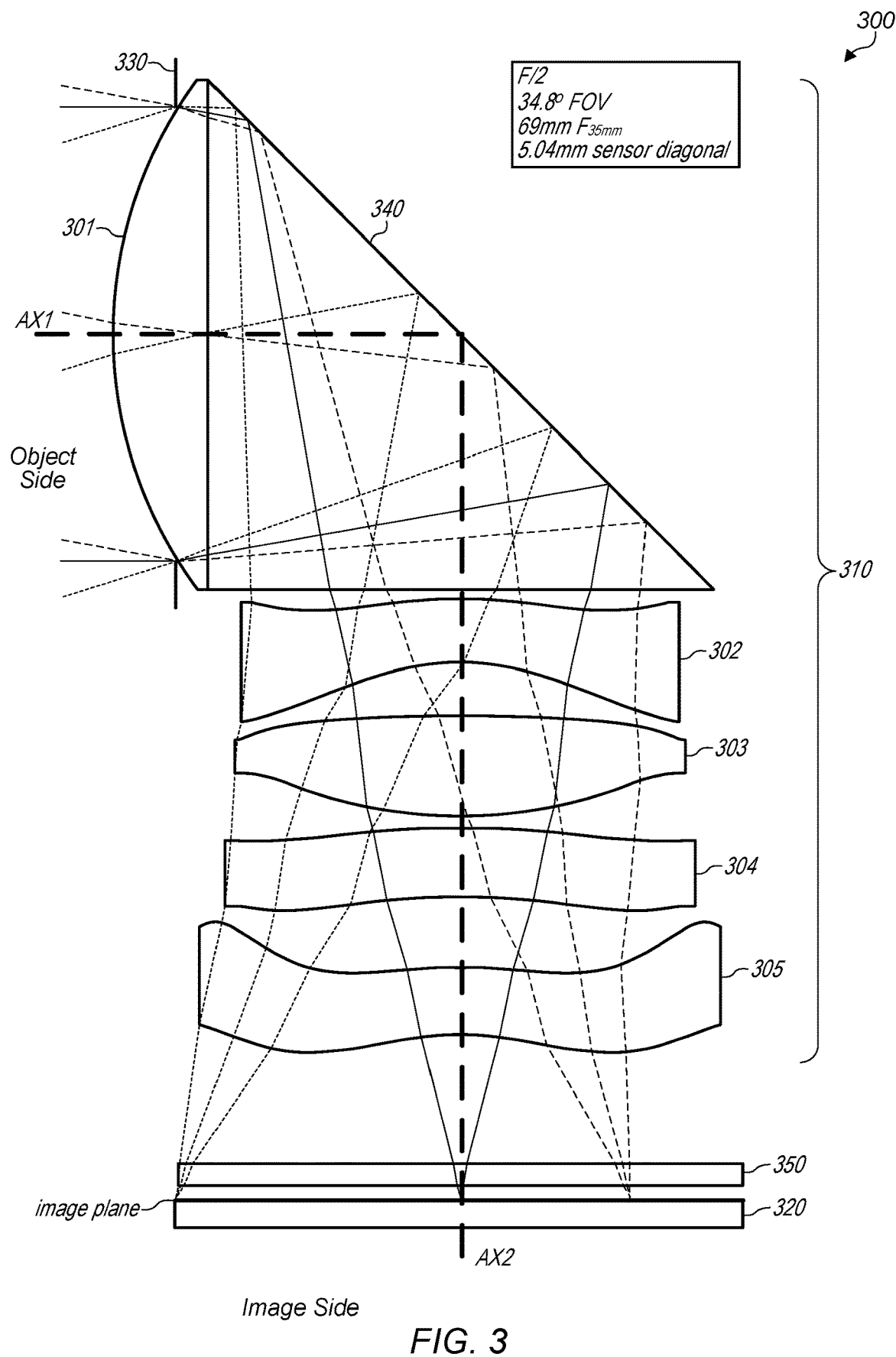
FIG. 3 shows a camera that includes an example embodiment of a compact folded lens system that operates at F/2, with 34.8° full FOV.

FIG. 3 shows a camera 300 that includes an example embodiment of a compact folded lens system 310 that operates at F/2, with 34.8° full FOV. Camera 300 includes a 5.04 mm diagonal photosensor 320. Lens system 310 includes five lens elements with refractive power and a folding element such as a prism, in order from the object side to the image side of the lens system: a first lens element 301 with positive refractive power, a folding element 340 such as a prism to fold the optical axis from AX1 to AX2, a second lens element 302 with negative refractive power, a third lens element 303 with positive refractive power, a fourth lens element 304 with refractive power, and a fifth lens element 305 with refractive power. An aperture stop 330 may be located between the object side of the lens system 310 and the folding element 340, for example at or near the object side surface of lens element 301, for controlling the brightness of the optical system. In some embodiments, the lens system 310 or camera 300 includes an IR filter 350 to reduce or eliminate interference of environmental noises on the photosensor 320.

Tables 10-13 correspond to an embodiment of a lens system 310 as illustrated in FIG. 3, and provide example values for various optical and physical parameters of the lens system 310 and camera 300 of FIG. 3. The effective focal length (EFL) of the lens system 310 is 8 mm. Given the EFL and photosensor size, the 35 mm equivalent focal length of the camera 300 may be 69 mm. While not shown in FIG. 3, in some embodiments, the camera 300/lens system 310 has the capability of autofocusing from Macro to Infinity conjugates.

The modulation transfer functions (MTF) for lens system 310 are higher than 0.4 at 250 lp/mm; the lens system 310 provides good contrast for high-resolution imaging. On-axis and off-axis aberrations for lens system 310 are well balanced across the FOV. Optical distortion across the FOV is controlled within 2%, while field curvature and astigmatism are well balanced across the FOV.

In some embodiments, Z-height of the example lens system 310, as defined from the front vertex of lens element 301 to the rear vertex of the folding element 340, may be 5.35 mm. The lens system 310 is able to fit into a wide variety of portable electronic devices including but not limited to smart phones and tablets.

Example Lens System 410

Figure 4:
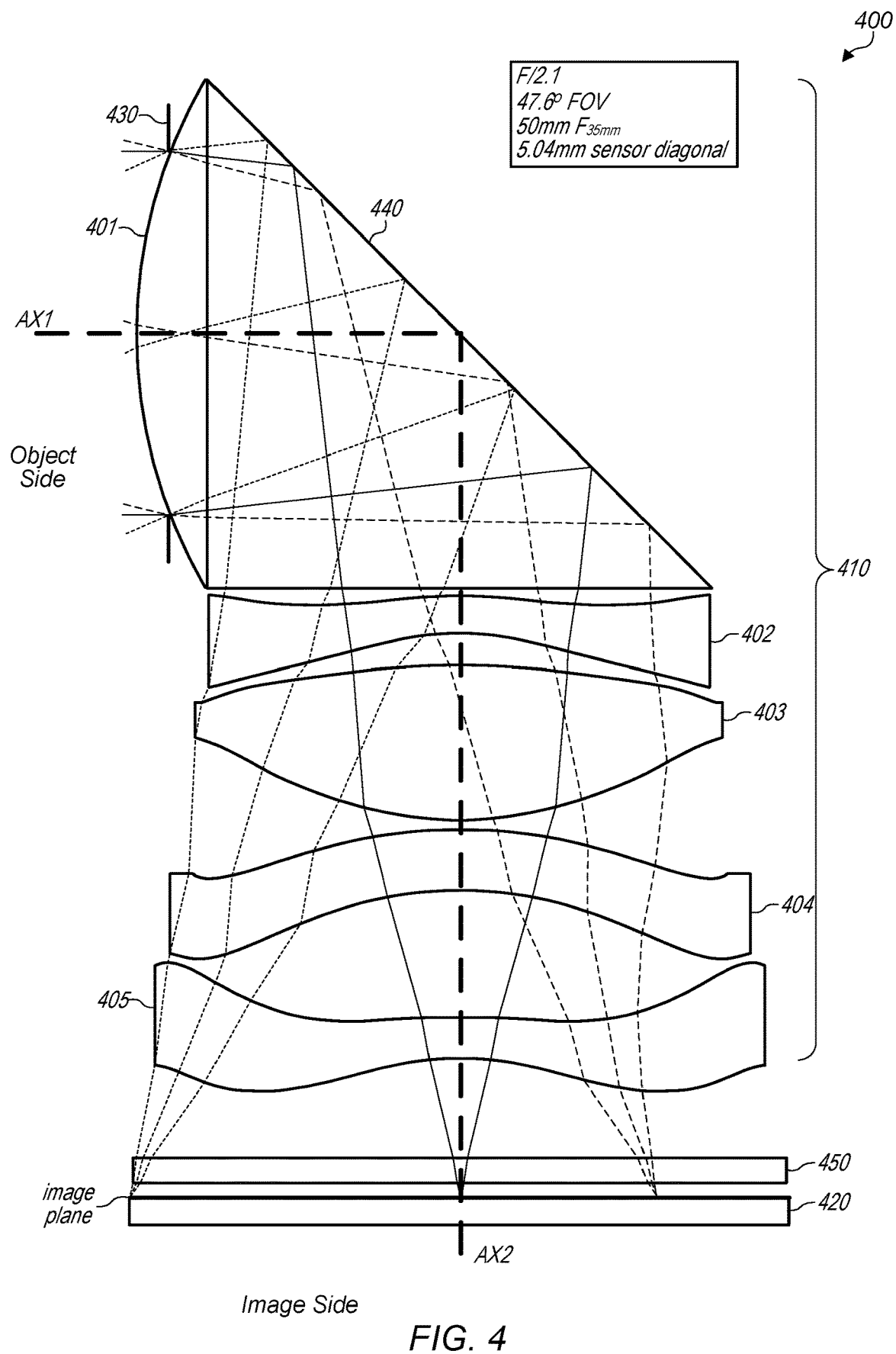
FIG. 4 shows a camera that includes an example embodiment of a compact folded lens system that operates at F/2.1, with 47.6° full FOV.

FIG. 4 shows a camera 400 that includes an example embodiment of a compact folded lens system 410 that operates at F/2.1, with 47.6° full FOV. Camera 400 includes a 5.04 mm diagonal photosensor 420. Lens system 410 includes five lens elements with refractive power and a folding element such as a prism, in order from the object side to the image side of the lens system: a first lens element 401 with positive refractive power, a folding element 440 such as a prism to fold the optical axis from AX1 to AX2, a second lens element 402 with negative refractive power, a third lens element 403 with positive refractive power, a fourth lens element 404 with refractive power, and a fifth lens element 405 with refractive power. An aperture stop 430 may be located between the object side of the lens system 410 and the folding element 440, for example at or near the object side surface of lens element 401, for controlling the brightness of the optical system. In some embodiments, the lens system 410 or camera 400 includes an IR filter 450 to reduce or eliminate interference of environmental noises on the photosensor 420.

Tables 14-17 correspond to an embodiment of a lens system 410 as illustrated in FIG. 4, and provide example values for various optical and physical parameters of the lens system 410 and camera 400 of FIG. 4. The effective focal length (EFL) of the lens system 410 is 5.8 mm. Given the EFL and photosensor size, the 35 mm equivalent focal length of the camera 400 may be 50 mm. While not shown in FIG. 4, in some embodiments, the camera 400/lens system 410 has the capability of autofocusing from Macro to Infinity conjugates.

The modulation transfer functions (MTF) for lens system 410 are higher than 0.4 at 250 lp/mm; the lens system 410 provides good contrast for high-resolution imaging. On-axis and off-axis aberrations for lens system 410 are well balanced across the FOV. Optical distortion across the FOV is controlled within 2%, while field curvature and astigmatism are well balanced across the FOV.

In some embodiments, Z-height of the example lens system 410, as defined from the front vertex of lens element 401 to the rear vertex of the folding element 440, may be 4.5 mm. The lens system 410 is able to fit into a wide variety of portable electronic devices including but not limited to smart phones and tablets.

Example Lens System 510

Figure 5:
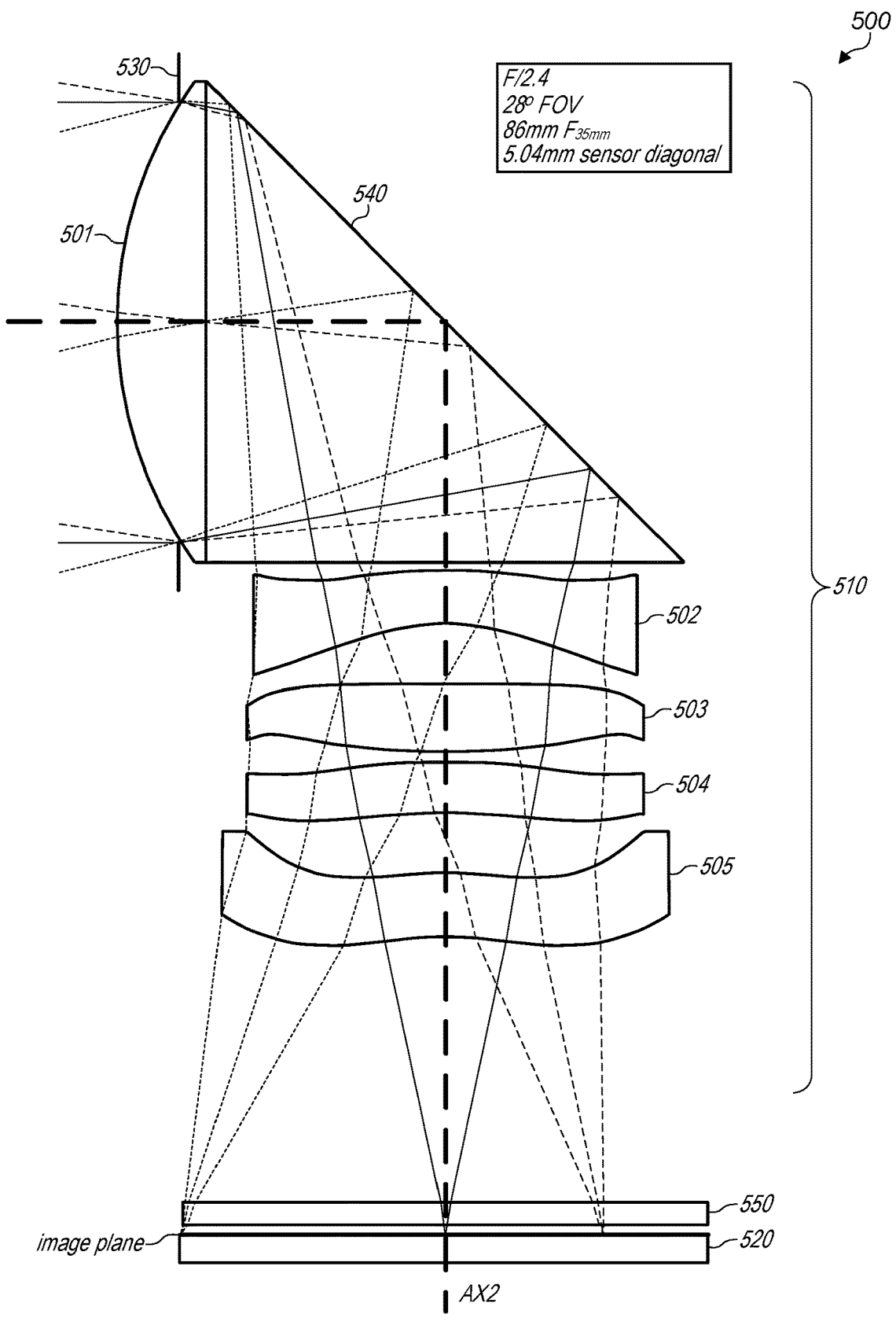
FIG. 5 shows a camera that includes an example embodiment of a compact folded lens system that operates at F/2.4, with 28° full FOV.

FIG. 5 shows a camera 500 that includes an example embodiment of a compact folded lens system 510 that operates at F/2.4, with 28° full FOV. Camera 500 includes a 5.04 mm diagonal photosensor 520. Lens system 510 includes five lens elements with refractive power and a folding element such as a prism, in order from the object side to the image side of the lens system: a first lens element 501 with positive refractive power, a folding element 540 such as a prism to fold the optical axis from AX1 to AX2, a second lens element 502 with negative refractive power, a third lens element 503 with positive refractive power, a fourth lens element 504 with refractive power, and a fifth lens element 505 with refractive power. An aperture stop 530 may be located between the object side of the lens system 510 and the folding element 540, for example at or near the object side surface of lens element 501, for controlling the brightness of the optical system. In some embodiments, the lens system 510 or camera 500 includes an IR filter 550 to reduce or eliminate interference of environmental noises on the photosensor 520.

Tables 18-21 correspond to an embodiment of a lens system 510 as illustrated in FIG. 5, and provide example values for various optical and physical parameters of the lens system 510 and camera 500 of FIG. 5. The effective focal length (EFL) of the lens system 510 is 10 mm. Given the EFL and photosensor size, the 35 mm equivalent focal length of the camera 500 may be 86 mm. While not shown in FIG. 5, in some embodiments, the camera 500/lens system 510 has the capability of autofocusing from Macro to Infinity conjugates.

The modulation transfer functions (MTF) for lens system 510 are higher than 0.4 at 250 lp/mm; the lens system 510 provides good contrast for high-resolution imaging. On-axis and off-axis aberrations for lens system 510 are well balanced across the FOV. Optical distortion across the FOV is controlled within 2%, while field curvature and astigmatism are well balanced across the FOV.

In some embodiments, Z-height of the example lens system 510, as defined from the front vertex of lens element 501 to the rear vertex of the folding element 540, may be 5.4 mm. The lens system 510 is able to fit into a wide variety of portable electronic devices including but not limited to smart phones and tablets.

Folded Lens Systems with Five Lens Elements—Alternative Embodiments

Figure 6:
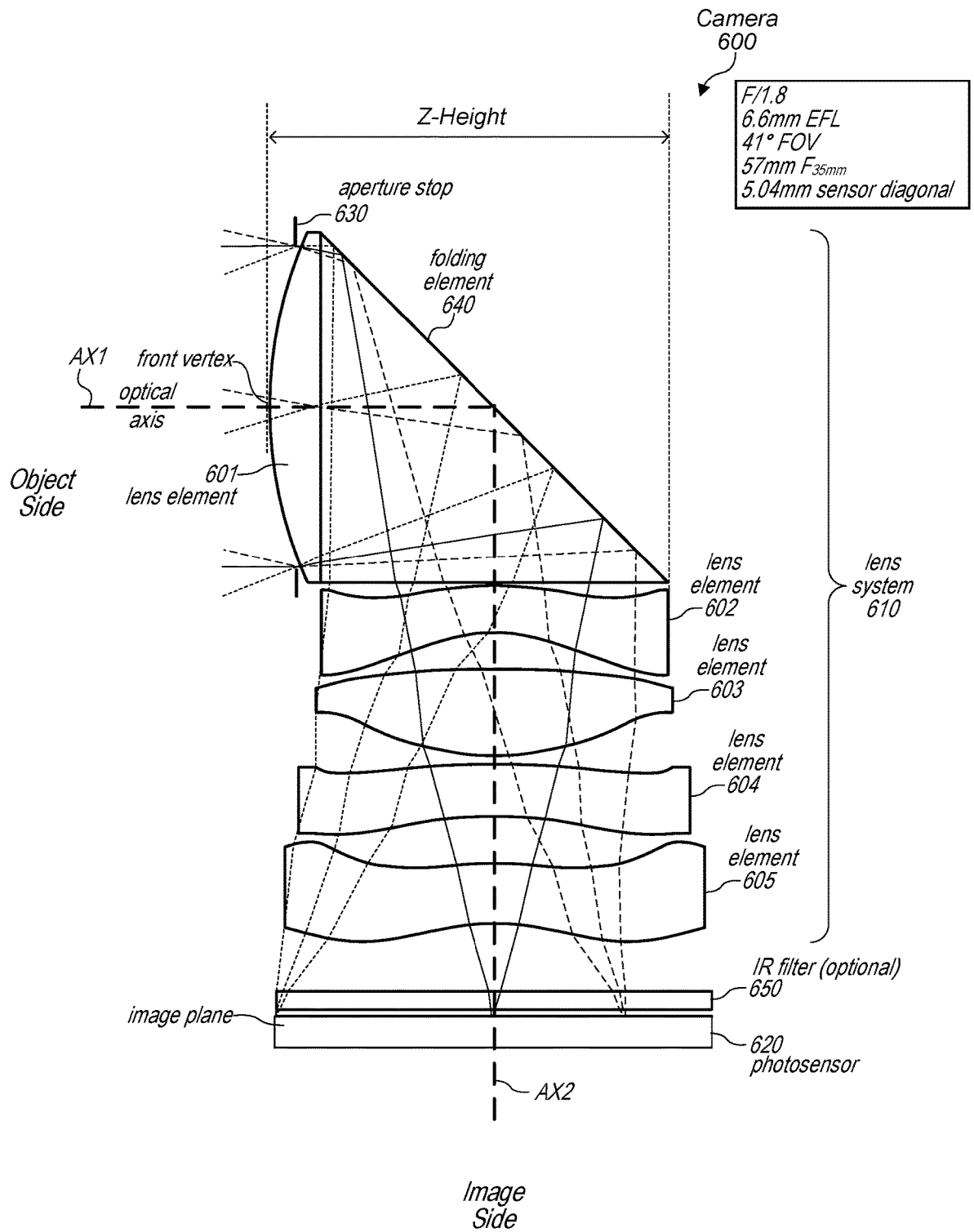
FIG. 6 is a cross-sectional illustration of a compact camera including an example embodiment of a compact folded lens system with five lens elements and a light folding element.

FIG. 6 is a cross-sectional illustration of a compact camera including an example embodiment of a compact folded lens system 610 with five lens elements 601-605 and a light folding element 640 such as a prism that "folds" the optical axis of the lens system 610. The camera 600 may also include an aperture stop 630, an optional IR filter 650, and a photosensor 620. A compact camera 600 including an embodiment of the compact folded lens system 610 as illustrated in FIG. 6 may, for example, be implemented in portable electronic devices such as mobile phones and tablets. For embodiments of a lens system 610 as illustrated in FIG. 6, the 35 mm equivalent focal length ($f_{35\ mm}$) of the lens is longer than 50 mm. A compact folded lens system 610 having a long $f_{35\ mm}$ may, for example, be used stand-alone for telephoto photography, or can be paired with a wide-angle imaging lens in a dual-prime configuration to enable effective optical zoom for portable electronic devices.

Embodiments of a compact folded lens system 610 that provides high brightness and high angular resolution. Embodiments of the lens system 610 include five lens elements 601-605 with refractive power and a light folding element 640 such as a prism to fold the optical axis. Embodiments of the compact folded lens system 610 may provide a 35 mm equivalent focal length in the range of 50-85 mm and less than 6 mm of Z-height to fit in a wide variety of portable electronics devices. With proper arrangement of materials, lens power and surface shapes, embodiments of the lens system 610 are capable of capturing high brightness photos with high image quality and with a higher angular resolution when compared with conventional lens systems.

As illustrated in the example camera 600 of FIG. 6, the compact folded lens system 610 includes five elements with refractive power and a light folding element 640 (e.g., a prism), in order from the object side to the image side of the lens system 610: a first lens element 601 with positive refractive power; a folding element 640 such as a prism to fold the optical axis from AX1 to AX2; a second lens element 602 with negative refractive power; a third lens element 603 with positive refractive power; a fourth lens element 604 with refractive power; and a fifth lens element 605 with refractive power. An aperture stop 630 may be located between the object side of the lens system 610 and the folding element 640 for controlling the brightness of the optical system. In some embodiments, the camera 600 includes an IR filter 650 to reduce or eliminate interference of environmental noises on the photosensor 620. In some embodiments, the photosensor 620 and/or lens system 610 may be shifted along AX2 to allow refocusing of the lens system 610 in between Infinity conjugate and Macro conjugate. In various embodiments, lens element 602, lens element 603, lens element 604, and/or lens element 605 may be round, rectangular, or some other shape.

In embodiments of lens system 610, one or more of the following requirements may be satisfied, for example to facilitate correction of aberrations across the field of view (FOV) for the lens system 610:

Lens 601 has a convex object-side surface in the paraxial region.

Lens 602 has a concave image-side surface in the paraxial region. Both the object-side and image-side surfaces of Lens 602 are aspheric.

Lens 603 has a convex object-side surface in the paraxial region.

Lens 605 has a concave image-side surface in the paraxial region. Both the object-side and image-side surfaces of Lens 605 are aspheric.

In various embodiments, the other lens surfaces of lens elements 601 through 605 may be concave, convex, or flat/plano (e.g., the lenses may be plano-concave or plano-convex lenses) in the paraxial region.

In some embodiments, at least one of the lens elements is made of lightweight polymer or plastic material.

In some embodiments, lens element 601, lens element 603, and lens element 605 are formed of optical materials with Abbe number Vd>40, and lens element 602 is formed of an optical material with Abbe number Vd<30. The material and power configurations of the lens elements 606, 602, 603, and 605 are selected for reduction of chromatic aberrations.

In some embodiments, lens element 604 is formed of optical material with no limit in Abbe number.

FIG. 6 shows an example camera 600 that includes an example embodiments of a compact folded lens system 610 that operates at F/1.8, 41° full field of view. Camera 600 includes a 5.04 mm diagonal photosensor 620. The effective focal length (EFL) of the lens system 610 is 6.6 mm. Given the EFL and photosensor size, the 35 mm equivalent focal length of the camera 600 is 57 mm.

For lens system 610, the modulation transfer function (MTF) of the axial field is higher than 0.6 at 250 line pairs (lp)/mm, while MTFs for lens system 610 at the edge of the photosensor exceed 0.39 at 250 lp/mm, showing good optical imaging capability for high-resolution imaging. For lens system 610, both on-axis and off-axis transverse ray aberrations are well balanced across the field of view. For lens system 610, optical distortion across the FOV is controlled within 6%, while field curvature and astigmatism are well balanced across the FOV.

In some embodiments, Z-height of the example lens system 610, as defined from the front vertex of lens element 601 to the rear vertex of the folding element 640 is may be 4.8 mm. The lens system 610 is thus able to fit into a wide variety of portable electronic devices including but not limited to smart phones and tablets.

Example Lens System Tables

The following Tables provide example values for various optical and physical parameters of the example embodiments of the lens systems and cameras as described in reference to FIGS. 1 through 5. Tables 1-4 correspond to an example embodiment of a lens system 110 as illustrated in FIG. 1. Tables 5-9 correspond to an example embodiment of a lens system 210 as illustrated in FIGS. 2A and 2B. Note that Tables 5-9 may also correspond to an example embodiment of a lens system 610 as illustrated in FIG. 6. Tables 10-13 correspond to an example embodiment of a lens system 310 as illustrated in FIG. 3. Tables 14-17 correspond to an example embodiment of a lens system 410 as illustrated in FIG. 4. Tables 18-21 correspond to an example embodiment of a lens system 510 as illustrated in FIG. 5.

In the Tables, all dimensions are in millimeters (mm) unless otherwise specified. L1, L2, L3, L4, and L5 stand for refractive lenses 1, 2, 3, 4, and 5, respectively. "S #" stands for surface number. A positive radius indicates that the center of curvature is to the right (object side) of the surface. A negative radius indicates that the center of curvature is to the left (image side) of the surface. "INF" stands for infinity (as used in optics). The thickness (or separation) is the axial distance to the next surface. FNO stands for F-number of the lens system. FOV stands for full field of view. $f_{35\ mm}$ is the 35 mm equivalent focal length of the lens system. $V_1$ is the Abbe number of the first lens element, $V_2$ is the Abbe number of the second lens element, and $V_5$ is the Abbe number of the fifth lens element. Both f and EFL stand for effective focal length of the lens system, f1 stands for focal length of the first lens element, f2 stands for focal length of the second lens element, and f5 stands for focal length of the fifth lens element. Z stands for Z-height of the lens system as defined from the front (image side) vertex of the lens system to the rear vertex of the folding element (e.g., prism), as shown in FIG. 1. REFL represents a reflective surface.

For the materials of the lens elements and IR filter, a refractive index $N_d$ at the helium d-line wavelength is provided, as well as an Abbe number Vd relative to the d-line and the C- and F-lines of hydrogen. The Abbe number, Vd, may be defined by the equation:

$$V_d = (N_d - 1)/(N_F - N_C),$$

where $N_F$ and $N_C$ are the refractive index values of the material at the F and C lines of hydrogen, respectively.

Referring to the Tables of aspheric coefficients (Tables, 2A-2B, 6A-6B, 11A-11B, 15A-15B, and 19A-19B), the aspheric equation describing an aspherical surface may be given by:

$$Z = (cr^2/(1+\text{sqrt}[1-(1+K)c^2r^2])) + A_4r^4 + A_6r^6 + A_8r^8 + A_{10}r^{10} + A_{12}R^{12} + A_{14}r^{14} + A_{16}r^{16} + A_{18}r^{18} + A_{20}r^{20}$$

where Z is the sag of surface parallel to the z-axis (the z-axis and the optical axis are coincident in these example embodiments), r is the radial distance from the vertex, c is the curvature at the pole or vertex of the surface (the reciprocal of the radius of curvature of the surface), K is the conic constant, and $A_4$-$A_{20}$ are the aspheric coefficients. In the Tables, "E" denotes the exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some values in the Tables may be scaled up or down for larger or smaller implementations of a camera using an embodiment of a lens system as described herein.

Further note that surface numbers (S #) of the elements in the various embodiments of the lens system as shown in the Tables are listed from a first surface 0 at the object plane to a last surface at the image plane/photosensor surface. FIG. 7 illustrates numbering of the surfaces as used in the Tables. As shown in FIG. 7, in some embodiments of a compact folded lens system as described herein, the image side surface of the first lens element (lens 1) may be flat/plano (e.g., lens 1 may be plano-convex), and the image side surface of lens 1 may be at/in contact with the object side surface of the light folding prism 40 to effectively form a single combined unit or element. In these embodiments, the image side surface of lens 1 and the object side surface of the prism 40 form and are designated as a single surface, and the surfaces are numbered as illustrated in FIG. 7:

S0—Object plane
S1—Aperture stop
S2—Lens 1, object side surface
S3—Prism 40, image side surface
S4—Prism 40, reflective surface
S5—Prism, object side surface
S6—Lens 2, object side surface
S7—Lens 2, image side surface
S8—Lens 3, object side surface
S9—Lens 3, image side surface
S10—Lens 4, object side surface
S11—Lens 4, image side surface
S12—Lens 5, object side surface
S13—Lens 5, image side surface
S14—IR filter 50, object side surface
S15—IR filter 50, image side surface
S16—Photosensor 20, image plane

TABLE 1

Lens system 110
Fno = 1.6, EFL = 6.6 mm, FOV = 36.8°, $f_{35\,mm}$ = 63 mm

| Element | Surface (S#) | Radius (mm) | Thickness or separation (mm) | Refractive Index $N_d$ | Abbe Number $V_d$ |
|---|---|---|---|---|---|
| Object | 0 | INF | INF | | |
| Stop | 1 | INF | −0.506 | | |
| L1 | *2 | 4.212 | 0.787 | 1.513 | 56.6 |
| Prism | 3 | INF | 2.221 | 1.755 | 27.6 |
| | Decenter (1) | | | | |
| | 4 | INF | −2.221 | REFL | |
| | Bend (1) | | | | |
| | 5 | INF | −0.057 | | |
| L2 | *6 | −4.906 | −0.71 | 1.661 | 20.4 |
| | *7 | −2.248 | −0.321 | | |
| L3 | *8 | −9.208 | −1.217 | 1.545 | 55.9 |
| | *9 | 2.877 | −0.075 | | |
| L4 | *10 | −4.08 | −0.615 | 1.651 | 21.5 |
| | *11 | −2.719 | −0.863 | | |
| L5 | *12 | −3.754 | −0.435 | 1.545 | 55.9 |
| | *13 | −2.223 | −0.655 | | |
| IR filter | 14 | INF | −0.21 | 1.517 | 64.2 |
| | 15 | INF | −0.1 | | |
| | 16 | INF | 0 | | |

*Annotates aspheric surfaces (aspheric coefficients given in Tables 2A-2B)

TABLE 2A

Aspheric Coefficients (Lens System 110)

| | Surface (S#) | | | | |
|---|---|---|---|---|---|
| | S2 | S6 | S7 | S8 | S9 |
| K | 0 | 0 | 0 | 0 | 0 |
| A4 | −5.357761E−04 | 2.731874E−02 | 2.573618E−02 | −1.511922E−02 | −4.460163E−02 |
| A6 | 1.105276E−04 | 1.234686E−03 | 1.388139E−02 | 5.668128E−03 | 2.319271E−02 |
| A8 | −4.394294E−05 | −8.722813E−04 | −7.136351E−03 | 1.384716E−03 | −9.380765E−03 |
| A10 | 6.782631E−06 | 4.606553E−05 | 2.353243E−03 | −1.211195E−03 | 2.609034E−03 |
| A12 | −4.251782E−07 | 4.222715E−05 | −4.334703E−04 | 1.944925E−04 | −5.256707E−04 |
| A14 | 0.00000E+00 | −7.478799E−06 | 3.673479E−05 | −7.814034E−06 | 4.474664E−05 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 2B

Aspheric Coefficients (Lens System 110)

| | Surface (S#) | | | |
|---|---|---|---|---|
| | S10 | S11 | S12 | S13 |
| K | 0 | 0 | 0 | 0 |
| A4 | −4.178722E−03 | 4.684591E−02 | 7.377046E−02 | 7.104354E−02 |
| A6 | −1.880870E−03 | −3.156555E−02 | 1.472934E−02 | 1.941874E−02 |
| A8 | 2.439762E−03 | 1.538259E−02 | −1.864916E−02 | −1.829469E−02 |
| A10 | −6.616621E−04 | −4.078361E−03 | 6.856286E−03 | 6.727793E−03 |
| A12 | 4.967682E−05 | 5.880739E−04 | −1.190404E−03 | −1.198343E−03 |
| A14 | 4.327487E−06 | −3.429023E−05 | 7.727763E−05 | 8.667080E−05 |

TABLE 2B-continued

Aspheric Coefficients (Lens System 110)

| | Surface (S#) | | | |
|---|---|---|---|---|
| | S10 | S11 | S12 | S13 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 3

Decentering Constants (Lens System 110)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 4

Optical Definitions (Lens system 110)

| EFL | 6.6 mm | $V_2$ | 20.4 |
|---|---|---|---|
| FNO | 1.6 | $V_5$ | 55.9 |
| FOV | 36.8° | $|f/f1|$ | 0.49 |
| $f_{35\,mm}$ | 63 mm | $|f/f2|$ | 0.95 |
| Z | 5.2 mm | $|f/f3|$ | 1.59 |
| $V_1$ | 56.6 | | |

TABLE 5

Lens system 210
Fno = 1.8, EFL = 6.6 mm, FOV = 41°, $f_{35\,mm}$ = 57 mm

| Element | Surface (S#) | Radius (mm) | Thickness or separation (mm) | Refractive Index $N_d$ | Abbe Number $V_d$ |
|---|---|---|---|---|---|
| Object | 0 | INF | INF **1 | | |
| Stop | 1 | INF | −0.466 | | |
| L1 | *2 | 3.641 | 0.747 | 1.545 | 55.9 |
| Prism | 3 | INF | 1.9945 | 1.755 | 27.6 |
| | Decenter (1) | | | | |
| | 4 | INF | −1.9945 | REFL | |
| | Bend (1) | | | | |
| | 5 | INF | −0.053 | | |
| L2 | *6 | −4.062 | −0.508 | 1.661 | 20.4 |
| | *7 | −2.09 | −0.387 | | |
| L3 | *8 | −13.935 | −1.046 | 1.545 | 55.9 |
| | *9 | 2.55 | −0.075 | | |
| L4 | *10 | −30.366 | −0.4 | 1.651 | 21.5 |
| | *11 | −6.362 | −0.72 | | |
| L5 | *12 | −5.73 | −0.683 | 1.545 | 55.9 |
| | *13 | −2.428 | −0.709 | | |
| IR filter | 14 | INF | −0.21 | 1.517 | 64.2 |
| | 15 | INF | −0.1 | | |
| | 16 | INF | 0 **2 | | |

*Annotates aspheric surfaces (aspheric coefficients given in Tables 6A-6B)
** Annotates zoom parameters (values given in Table 8)

TABLE 6A

Aspheric Coefficients (Lens System 210)

| | Surface (S#) | | | | |
|---|---|---|---|---|---|
| | S2 | S6 | S7 | S8 | S9 |
| K | 0 | 0 | 0 | 0 | 0 |
| A4 | −3.728105E−04 | 3.801248E−02 | 3.704204E−02 | −3.552529E−03 | −1.115833E−01 |
| A6 | −2.761708E−05 | 7.789298E−03 | 1.848649E−02 | −9.384527E−03 | 8.758012E−02 |
| A8 | 0.000000E+00 | −5.613707E−03 | −1.131671E−02 | 1.523142E−02 | −3.811382E−02 |
| A10 | 0.000000E+00 | 1.658267E−03 | 4.153769E−03 | −7.214442E−03 | 1.007322E−02 |
| A12 | 0.000000E+00 | −2.039304E−04 | −8.554172E−04 | 1.338770E−03 | −1.710545E−03 |
| A14 | 0.000000E+00 | 2.253770E−06 | 8.371391E−05 | −8.510266E−05 | 1.321686E−04 |
| A16 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 |
| A20 | 0.00000E+00 | 0.00000E+00 | 0.00000E+00 | 0.00000E+00 | 0.00000E+00 |

TABLE 6B

Aspheric Coefficients (Lens System 210)

| | Surface (S#) | | | |
|---|---|---|---|---|
| | S10 | S11 | S12 | S13 |
| K | 0 | 0 | 0 | 0 |
| A4 | −1.149197E−01 | −2.542228E−02 | 3.886043E−02 | 4.078698E−02 |
| A6 | 7.318462E−02 | 3.341206E−03 | 3.907388E−02 | 4.620519E−02 |
| A8 | −2.535174E−02 | 5.908207E−03 | −2.489285E−02 | −3.814786E−02 |
| A10 | 5.732792E−03 | −2.297764E−03 | 3.985391E−03 | 1.651803E−02 |
| A12 | −8.631109E−04 | 3.385782E−04 | 1.432923E−03 | −4.396341E−03 |
| A14 | 6.661212E−05 | −1.851532E−05 | −6.779379E−04 | 7.280474E−04 |
| A16 | 0.000000E+00 | 0.000000E+00 | 9.681549E−05 | −6.937402E−05 |
| A18 | 0.000000E+00 | 0.000000E+00 | −4.703332E−06 | 2.937712E−06 |
| A20 | 0.00000E+00 | 0.00000E+00 | 0.00000E+00 | 0.00000E+00 |

TABLE 7

Decentering Constants (Lens System 210)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 8

Zoom Parameters (Lens System 210)

| **Zoom parameters | Position - 1 | Position - 2 |
|---|---|---|
| **1 | Infinity | 500 mm |
| **2 | 0.000 | −0.0864 mm |

TABLE 9

Optical Definitions (Lens system 210)

| | | | |
|---|---|---|---|
| EFL | 6.6 mm | $V_2$ | 20.4 |
| FNO | 1.8 | $V_5$ | 55.9 |
| FOV | 41° | $|f/f1|$ | 0.56 |
| $f_{35\,mm}$ | 57 mm | $|f/f2|$ | 0.92 |
| Z | 4.75 mm | $|f/f3|$ | 1.64 |
| $V_1$ | 55.9 | | |

TABLE 10

Lens system 310
Fno = 2, EFL = 8 mm, FOV = 34.8°, $f_{35\,mm}$ = 69 mm

| Element | Surface (S#) | Radius (mm) | Thickness or separation (mm) | Refractive Index $N_d$ | Abbe Number $V_d$ |
|---|---|---|---|---|---|
| Object | 0 | INF | INF | | |
| Stop | 1 | INF | −0.5596 | | |
| L1 | *2 | 3.6775 | 0.8396 | 1.513 | 56.6 |
| Prism | 3 | INF | 2.2455 | 1.755 | 27.5 |
| | Decenter (1) | | | | |
| | 4 | INF | −2.2455 | REFL | |
| | Bend (1) | | | | |
| | 5 | INF | −0.0847 | | |
| L2 | *6 | −4.1943 | −0.5570 | 1.651 | 21.5 |
| | *7 | −2.0931 | −0.4734 | | |
| L3 | *8 | −20.8906 | −0.8866 | 1.545 | 55.9 |
| | *9 | 3.1767 | −0.1090 | | |
| L4 | *10 | 584.0340 | −0.5998 | 1.651 | 21.5 |
| | *11 | −9.3888 | −0.6258 | | |
| L5 | *12 | −4.4712 | −0.5938 | 1.545 | 55.9 |
| | *13 | −2.5550 | −1.1319 | | |
| IR filter | 14 | INF | −0.2100 | 1.517 | 64.2 |
| | 15 | INF | −0.1000 | | |
| | 16 | INF | 0.0000 | | |

*Annotates aspheric surfaces (aspheric coefficients given in Tables 11A-11B)

TABLE 11A

Aspheric Coefficients (Lens System 310)

| | Surface (S#) | | | | |
|---|---|---|---|---|---|
| | S2 | S6 | S7 | S8 | S9 |
| K | 0 | 0 | 0 | 0 | 0 |
| A4 | −3.543479E−04 | 3.253840E−02 | 3.222651E−02 | −5.951406E−03 | −9.559396E−02 |
| A6 | −3.541361E−05 | 5.986665E−03 | 1.423733E−02 | −8.480041E−03 | 9.186468E−02 |
| A8 | 0.000000E+00 | −2.732974E−03 | −6.870143E−03 | 1.178070E−02 | −4.653876E−02 |
| A10 | 0.000000E+00 | 3.189174E−04 | 2.287463E−03 | −5.142299E−03 | 1.374451E−02 |
| A12 | 0.000000E+00 | 5.700839E−05 | −4.848185E−04 | 8.503293E−04 | −2.390848E−03 |
| A14 | 0.000000E+00 | −1.435959E−05 | 5.573737E−05 | −4.332038E−05 | 1.805648E−04 |
| A16 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 |
| A20 | 0.00000E+00 | 0.00000E+00 | 0.00000E+00 | 0.00000E+00 | 0.00000E+00 |

TABLE 11B

Aspheric Coefficients (Lens System 310)

| | Surface (S#) | | | |
|---|---|---|---|---|
| | S10 | S11 | S12 | S13 |
| K | 0 | 0 | 0 | 0 |
| A4 | −1.124907E−01 | −3.637941E−02 | 5.611178E−02 | 7.661749E−02 |
| A6 | 9.629997E−02 | 2.329195E−02 | 1.167349E−02 | −7.476426E−04 |
| A8 | −3.972609E−02 | 2.698882E−03 | −6.997990E−03 | −3.441381E−03 |
| A10 | 8.731665E−03 | −5.801677E−03 | 2.038859E−03 | 1.239308E−03 |
| A12 | −9.423572E−04 | 2.098060E−03 | −3.754015E−04 | −2.079708E−04 |
| A14 | 3.777199E−05 | −3.240222E−04 | 2.566374E−05 | 1.389937E−05 |
| A16 | 0.000000E+00 | 1.817865E−05 | 0.000000E+00 | 0.000000E+00 |
| A18 | 0.000000E+00 | 0.000000E+00 | 0.000000E+00 | 0.000000E+00 |
| A20 | 0.00000E+00 | 0.00000E+00 | 0.00000E+00 | 0.00000E+00 |

TABLE 12

Decentering Constants (Lens System 310)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 13

Optical Definitions (Lens system 310)

| EFL | 8 mm | $V_2$ | 21.5 |
|---|---|---|---|
| FNO | 2 | $V_5$ | 55.9 |
| FOV | 34.8° | |f/f1| | 0.64 |
| $f_{35\ mm}$ | 69 mm | |f/f2| | 1.12 |
| Z | 5.35 mm | |f/f3| | 1.57 |
| $V_1$ | 56.6 | | |

TABLE 14

Lens system 410
Fno = 2.1, EFL = 5.8 mm, FOV = 47.6°, $f_{35\ mm}$ = 50 mm

| Element | Surface (S#) | Radius (mm) | Thickness or separation (mm) | Refractive Index $N_d$ | Abbe Number $V_d$ |
|---|---|---|---|---|---|
| Object | 0 | INF | INF | | |
| Stop | 1 | INF | −0.2427 | | |
| L1 | *2 | 3.6317 | 0.5227 | 1.513 | 56.6 |
| Prism | 3 | INF | 1.9477 | 1.755 | 27.5 |
| Decenter (1) | | | | | |
| | 4 | INF | −1.9477 | REFL | |
| Bend (1) | | | | | |
| | 5 | INF | −0.0500 | | |
| L2 | *6 | −3.7998 | −0.2821 | 1.661 | 20.4 |
| | *7 | −2.0696 | −0.2475 | | |
| L3 | *8 | −7.3359 | −1.1747 | 1.545 | 55.9 |
| | *9 | 2.5319 | −0.0750 | | |
| L4 | *10 | −5.2205 | −0.4590 | 1.545 | 55.9 |
| | *11 | −3.4705 | −0.9676 | | |

TABLE 14-continued

Lens system 410
Fno = 2.1, EFL = 5.8 mm, FOV = 47.6°, $f_{35\ mm}$ = 50 mm

| Element | Surface (S#) | Radius (mm) | Thickness or separation (mm) | Refractive Index $N_d$ | Abbe Number $V_d$ |
|---|---|---|---|---|---|
| L5 | *12 | −10.9577 | −0.3090 | 1.545 | 55.9 |
|  | *13 | −2.4294 | −0.7488 |  |  |
| IR filter | 14 | INF | −0.2100 | 1.517 | 64.2 |
|  | 15 | INF | −0.1000 |  |  |
|  | 16 | INF | 0.0000 |  |  |

*Annotates aspheric surfaces (aspheric coefficients given in Tables 15A-15B)

TABLE 15A

Aspheric Coefficients (Lens System 410)

| | Surface (S#) | | | | |
|---|---|---|---|---|---|
| | S2 | S6 | S7 | S8 | S9 |
| K | 0 | 0 | 0 | 0 | 0 |
| A4 | −1.300522E−03 | 9.642883E−02 | 9.875465E−02 | −4.667939E−03 | −5.672380E−02 |
| A6 | −9.168145E−05 | −4.342572E−02 | −3.585467E−02 | −9.782603E−03 | 3.790312E−02 |
| A8 | 0.000000E+00 | 1.882713E−02 | 1.782417E−02 | 2.017753E−02 | −1.546446E−02 |
| A10 | 0.000000E+00 | −5.107428E−03 | −4.960728E−03 | −1.018229E−02 | 3.982122E−03 |
| A12 | 0.000000E+00 | 7.060263E−04 | 5.626970E−04 | 2.009152E−03 | −7.302047E−04 |
| A14 | 0.000000E+00 | −4.021340E−05 | 1.357917E−06 | −1.388362E−04 | 6.089109E−05 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 15B

Aspheric Coefficients (Lens System 410)

| | Surface (S#) | | | |
|---|---|---|---|---|
| | S10 | S11 | S12 | S13 |
| K | 0 | 0 | 0 | 0 |
| A4 | −6.766821E−02 | −4.821226E−02 | −5.436522E−02 | −4.810142E−02 |
| A6 | 5.572909E−02 | 4.233878E−02 | 1.452401E−01 | 1.652217E−01 |
| A8 | −2.181425E−02 | −1.690391E−02 | −9.228373E−02 | −1.213621E−01 |
| A10 | 4.575533E−03 | 3.503567E−03 | 3.105956E−02 | 5.252267E−02 |
| A12 | −4.596104E−04 | −2.690097E−04 | −5.952057E−03 | −1.433212E−02 |
| A14 | 2.059890E−05 | 1.011159E−06 | 6.201005E−04 | 2.437632E−03 |
| A16 | 0.000000E+00 | 0.000000E+00 | −2.948667E−05 | −2.358379E−04 |
| A18 | 0.000000E+00 | 0.000000E+00 | 2.796865E−07 | 9.881222E−06 |
| A20 | 0.00000E+00 | 0.00000E+00 | 0.00000E+00 | 0.00000E+00 |

TABLE 16

Decentering Constants (Lens System 410)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 17

Optical Definitions (Lens system 410)

| EFL | 5.8 mm | $V_2$ | 20.4 |
|---|---|---|---|
| FNO | 2.1 | $V_5$ | 55.9 |
| FOV | 47.6° | |f/f1| | 0.47 |
| $f_{35\ mm}$ | 50 mm | |f/f2| | 0.79 |
| Z | 4.5 mm | |f/f3| | 1.61 |
| $V_1$ | 56.6 | | |

TABLE 18

Lens system 510
Fno = 2.4, EFL = 10 mm, FOV = 28°, $f_{35\,mm}$ = 86 mm

| Element | Surface (S#) | Radius (mm) | Thickness or separation (mm) | | Refractive Index $N_d$ | Abbe Number $V_d$ |
|---|---|---|---|---|---|---|
| Object | 0 | INF | INF | | | |
| Stop | 1 | INF | −0.5846 | | | |
| L1 | *2 | 3.8250 | 0.8520 | | 1.513 | 56.6 |
| Prism | 3 | INF | 2.2765 | | 1.755 | 27.5 |
| | Decenter (1) | | | | | |
| | 4 | INF | −2.2765 | REFL | | |
| | Bend (1) | | | | | |
| | 5 | INF | −0.0750 | | | |
| L2 | *6 | −4.4110 | −0.5060 | | 1.651 | 21.5 |
| | *7 | −2.1500 | −0.5690 | | | |
| L3 | *8 | 136.2680 | −0.6400 | | 1.545 | 55.9 |
| | *9 | 5.1780 | −0.1000 | | | |
| L4 | *10 | −19.3960 | −0.4850 | | 1.651 | 21.5 |
| | *11 | −11.3640 | −0.5650 | | | |
| L5 | *12 | −4.6990 | −0.6000 | | 1.545 | 55.9 |
| | *13 | −3.6760 | −2.5120 | | | |
| IR filter | 14 | INF | −0.2100 | | 1.517 | 64.2 |
| | 15 | INF | −0.1000 | | | |
| | 16 | INF | 0.0000 | | | |

*Annotates aspheric surfaces (aspheric coefficients given in Tables 19A-19B)

TABLE 19A

Aspheric Coefficients (Lens System 510)

Surface (S#)

| | S2 | S6 | S7 | S8 | S9 |
|---|---|---|---|---|---|
| K | 0 | 0 | 0 | 0 | 0 |
| A4 | −2.968437E−04 | 3.202880E−02 | 3.192545E−02 | −1.146366E−02 | −8.657925E−02 |
| A6 | −2.235796E−05 | 4.933270E−03 | 1.379775E−02 | −8.370899E−03 | 9.124258E−02 |
| A8 | 0.000000E+00 | −2.377690E−03 | −6.516921E−03 | 1.157454E−02 | −4.680620E−02 |
| A10 | 0.000000E+00 | 2.802956E−04 | 2.188792E−03 | −5.139117E−03 | 1.365855E−02 |
| A12 | 0.000000E+00 | 0.000000E+00 | −5.018671E−04 | 8.478082E−04 | −2.395159E−03 |
| A14 | 0.000000E+00 | 0.000000E+00 | 5.823790E−05 | −4.637063E−05 | 1.821964E−04 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 19B

Aspheric Coefficients (Lens System 510)

Surface (S#)

| | S10 | S11 | S12 | S13 |
|---|---|---|---|---|
| K | 0 | 0 | 0 | 0 |
| A4 | −1.056047E−01 | −2.850646E−02 | 6.467129E−02 | 6.574440E−02 |
| A6 | 9.748800E−02 | 2.321459E−02 | 1.107832E−02 | −2.410507E−03 |
| A8 | −3.976934E−02 | 2.647715E−03 | −7.026971E−03 | −2.506694E−03 |
| A10 | 8.713341E−03 | −5.825014E−03 | 2.028524E−03 | 8.315244E−04 |
| A12 | −9.476594E−04 | 2.099403E−03 | −3.782833E−04 | −1.221099E−04 |
| A14 | 3.617451E−05 | −3.245188E−04 | 2.851855E−05 | 7.332506E−06 |
| A16 | 0.000000E+00 | 1.765818E−05 | 0.000000E+00 | 0.000000E+00 |
| A18 | 0.000000E+00 | 0.000000E+00 | 0.000000E+00 | 0.000000E+00 |
| A20 | 0.00000E+00 | 0.00000E+00 | 0.00000E+00 | 0.00000E+00 |

TABLE 20

Decentering Constants (Lens System 510)

| Decenter | X | Y | Z | Alpha(deg) | Beta(deg) | Gamma (deg) |
|---|---|---|---|---|---|---|
| D(1) and Bend (1) | 0 | 0 | 0 | 45 | 0 | 0 |

TABLE 21

Optical Definitions (Lens system 510)

| | | | |
|---|---|---|---|
| EFL | 10 mm | $V_2$ | 21.5 |
| FNO | 2.4 | $V_5$ | 55.9 |
| FOV | 28° | $|f/f1|$ | 0.77 |
| $f_{35\ mm}$ | 86 mm | $|f/f2|$ | 1.43 |
| Z | 5.4 mm | $|f/f3|$ | 1.02 |
| $V_1$ | 56.6 | | |

Example Flowchart

Figure 8:
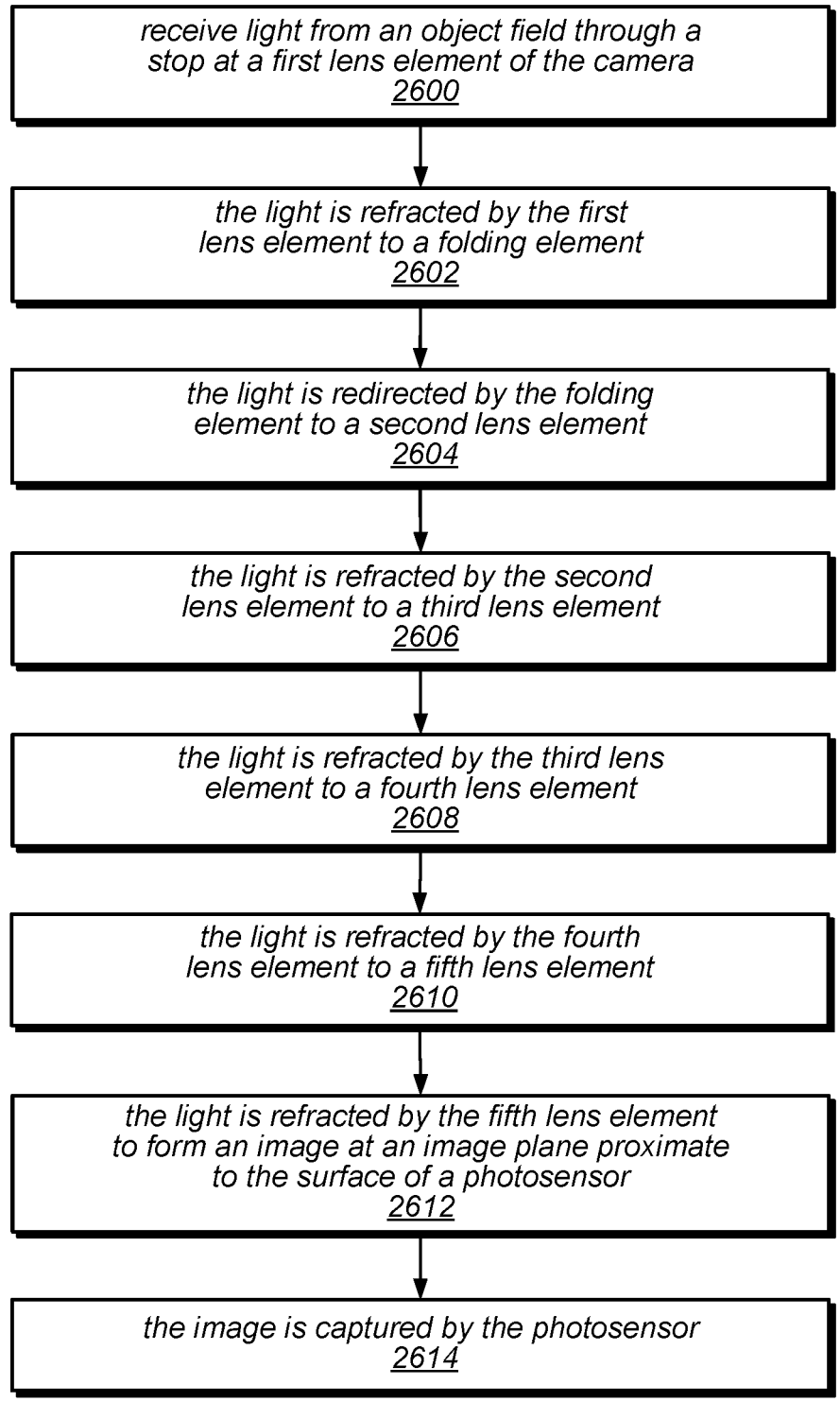
FIG. 8 is a flowchart of a method for capturing images using cameras with lens systems as illustrated in FIGS. 1 through 7, according to some embodiments.

FIG. 8 is a high-level flowchart of a method for capturing images using a camera with a lens system that includes five lens elements and a folding element as illustrated in FIGS. 1 through 7, according to some embodiments. As indicated at 2600, light from an object field in front of the camera is received at a first lens element of the camera through an aperture stop. In some embodiments, the aperture stop may be located at the first lens element and behind the front vertex of the lens system. As indicated at 2602, the first lens element refracts the light on a first axis AX1 to a light folding element such as a prism. As indicated at 2604, the light is redirected by the folding element to a second lens element on a second axis AX2. As indicated at 2606, the light is then refracted by the second lens element to a third lens element on the second axis AX2. As indicated at 2608, the light is then refracted by the third lens element to a fourth lens element on the second axis AX2. As indicated at 2610, the light is then refracted by the fourth lens element to a fifth lens element on the second axis AX2. As indicated at 2612, the light is then refracted from the fifth lens element to form an image at an image plane at or near the surface of a photosensor. As indicated at 2614, the image is captured by the photosensor. While not shown, in some embodiments, the light may pass through an infrared filter that may for example be located between the fifth lens element and the photosensor.

In some embodiments, the elements referred to in FIG. 8 may be configured as illustrated in FIGS. 1 through 6. However, note that variations on the examples as given in the Figures are possible while achieving similar optical results.

Example Computing Device

Figure 9:
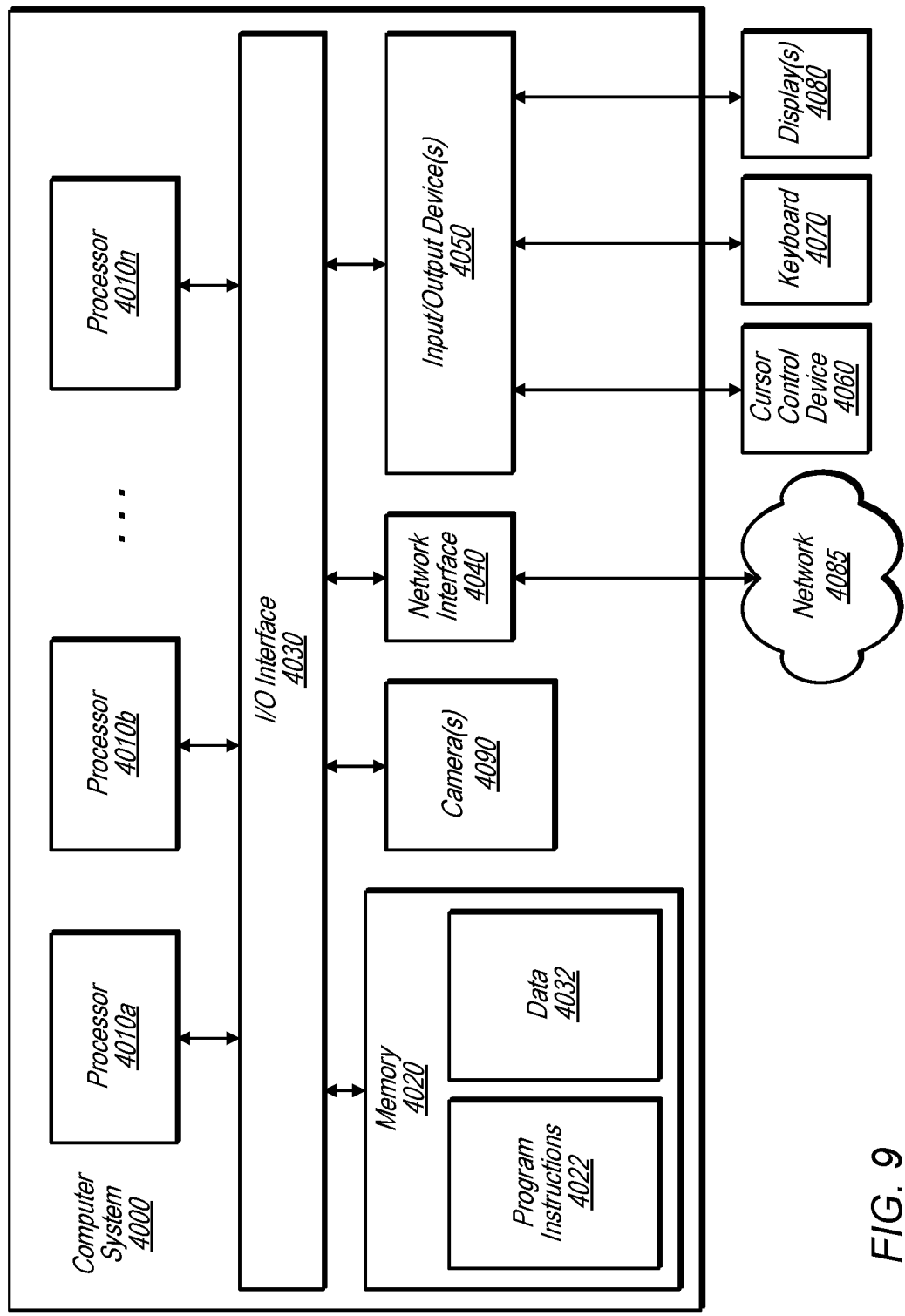
FIG. 9 illustrates an example computer system that may be used in embodiments.

FIG. 9 illustrates an example computing device, referred to as computer system 4000, that may include or host embodiments of the camera as illustrated in FIGS. 1 through 8. In addition, computer system 4000 may implement methods for controlling operations of the camera and/or for performing image processing of images captured with the camera. In different embodiments, computer system 4000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a mobile multipurpose device, a wireless phone, a smartphone, a consumer device, video game console, handheld video game device, application server, storage device, a television, a video recording device, or in general any type of computing or electronic device.

In the illustrated embodiment, computer system 4000 includes one or more processors 4010 coupled to a system memory 4020 via an input/output (I/O) interface 4030. Computer system 4000 further includes a network interface 4040 coupled to I/O interface 4030, and one or more input/output devices 4050, such as cursor control device 4060, keyboard 4070, and display(s) 4080. Computer system 4000 may also include one or more cameras 4090, for example one or more cameras as described above with respect to FIGS. 1 through 8, which may also be coupled to I/O interface 4030, or one or more cameras as described above with respect to FIGS. 1 through 8 along with one or more other cameras such as wide-field cameras.

In various embodiments, computer system 4000 may be a uniprocessor system including one processor 4010, or a multiprocessor system including several processors 4010 (e.g., two, four, eight, or another suitable number). Processors 4010 may be any suitable processor capable of executing instructions. For example, in various embodiments processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4020 may be configured to store program instructions 4022 and/or data 4032 accessible by processor 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions 4022 may be configured to implement various interfaces, methods and/or data for controlling operations of camera 4090 and for capturing and processing images with integrated camera 4090 or other methods or data, for example interfaces and methods for capturing, displaying, processing, and storing images captured with camera 4090. In some embodiments, program instructions and/or data may be received, sent or stored upon different types of computer-accessible media or on similar media separate from system memory 4020 or computer system 4000.

In one embodiment, I/O interface 4030 may be configured to coordinate I/O traffic between processor 4010, system memory 4020, and any peripheral devices in the device, including network interface 4040 or other peripheral interfaces, such as input/output devices 4050. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices attached to a network 4085 (e.g., carrier or agent devices) or between nodes of computer system 4000. Network 4085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 4040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 4050 may, in some embodiments, include one or more display terminals, keyboards, keypads, touchpads, scanning devices, voice or optical recognition devices, or any other devices suitable for entering or accessing data by computer system 4000. Multiple input/output devices 4050 may be present in computer system 4000 or may be distributed on various nodes of computer system 4000. In some embodiments, similar input/output devices may be separate from computer system 4000 and may interact with one or more nodes of computer system 4000 through a wired or wireless connection, such as over network interface 4040.

As shown in FIG. 9, memory 4020 may include program instructions 4022, which may be processor-executable to implement any element or action to support integrated camera 4090, including but not limited to image processing software and interface software for controlling camera 4090. In some embodiments, images captured by camera 4090 may be stored to memory 4020. In addition, metadata for images captured by camera 4090 may be stored to memory 4020.

Those skilled in the art will appreciate that computer system 4000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 4000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 4000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 4000 may be transmitted to computer system 4000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
   a plurality of elements arranged along a folded optical axis of the lens system, wherein the plurality of elements includes, in order along the folded optical axis from an object side to an image side:
   a first lens element on a first portion of the folded optical axis having a convex object-side surface in a paraxial region, and positive refractive power;
   a light folding element configured to redirect light from the first lens element to a second portion of the folded optical axis, wherein no other lens element is positioned between the first lens element and the light folding element on the first portion of the folded optical axis;
   a second lens element on the second portion of the folded optical axis having a concave image-side surface in the paraxial region;
   a third lens element on the second portion of the folded optical axis;
   a fourth lens element on the second portion of the folded optical axis; and
   a fifth lens element on the second portion of the folded optical axis having a concave image-side surface in the paraxial region.

2. The lens system as recited in claim 1, wherein the first lens element has positive refractive power, the second lens element has negative refractive power, and the third lens element has positive refractive power.

3. The lens system as recited in claim 1, wherein the lens system further comprises an aperture stop located between the object side of the lens system and the light folding element.

4. The lens system as recited in claim 1, wherein the lens system provides a 35 mm equivalent focal length in the range of 50-85 mm and less than 6.5 mm of Z-height measured from a front vertex of the lens system to a rear vertex of the folding element.

5. The lens system as recited in claim 1, wherein the first, third and fifth lens elements are formed of optical materials with Abbe number Vd>40, and the second lens element is formed of an optical material with Abbe number Vd<30.

6. The lens system as recited in claim 1, wherein the first and fifth lens elements are formed of optical materials with Abbe number Vd>40, and the second lens element is formed of an optical material with Abbe number Vd<35.

7. The lens system as recited in claim 1, wherein both the object-side and image-side surfaces of the second lens element are aspheric.

8. The lens system as recited in claim 1, wherein both the object-side and image-side surfaces of the fifth lens element are aspheric.

9. The lens system as recited in claim 1, wherein the lens system satisfies one or more of the relationships:

$$0.3<|f/f1|<1$$

$$0.5<|f/f2|<2, \text{ or}$$

$$0.5<|f/f3|<2$$

where f is effective focal length of the lens system, f1 is focal length of the first lens element, f2 is focal length of the second lens element, and f3 is focal length of the third lens element.

10. The lens system as recited in claim 1, wherein at least one of the plurality of lens elements is formed of lightweight polymer or plastic material.

11. The lens system as recited in claim 1, wherein the light folding element is a prism.

12. The lens system as recited in claim 11, wherein an image side surface of the first lens element is flat/plano, and wherein the image side surface of the first lens element is in contact with the object side surface of the prism.

13. The lens system as recited in claim 1, wherein effective focal length of the lens system is within a range of 5.5 millimeters to 11 millimeters.

14. A camera, comprising:
a photosensor configured to capture light projected onto a surface of the photosensor; and
a folded lens system configured to refract light from an object field located in front of the camera to form an image of a scene at an image plane at or near the surface of the photosensor, wherein the lens system comprises five refractive lens elements arranged along a folded optical axis of the camera from an object side to an image side and a light folding element located between a first and second lens element from the object side and configured to redirect light from a first axis onto a second axis;
wherein the folded lens system satisfies one or more of the relationships:

$$0.3<|f/f1|<1$$

$$0.5<|f/f2|<2, \text{ or}$$

$$0.5<|f/f3|<2$$

where f is effective focal length of the folded lens system, f1 is focal length of the first lens element from the object side, f2 is focal length of the second lens element from the object side, and f3 is focal length of a third lens element from the object side.

15. The camera as recited in claim 14, wherein the folded lens system provides a 35 mm equivalent focal length in the range of 50-85 mm.

16. The camera as recited in claim 14, wherein Z-height of the folded lens system measured from a front vertex of the lens system to a rear vertex of the folding element is less than 6.5 mm.

17. The camera as recited in claim 14, wherein effective focal length of the lens system is within a range of 5.5 millimeters to 11 millimeters, and wherein the photosensor is between 4 millimeters and 8 millimeters in a diagonal dimension.

18. The camera as recited in claim 14, wherein the photosensor is configured to move on one or more axes relative to the lens system to adjust focus of the camera.

19. A device, comprising:
one or more processors;
one or more cameras; and
a memory comprising program instructions executable by at least one of the one or more processors to control operations of the one or more cameras;
wherein at least one of the one or more cameras is a camera comprising:
a photosensor configured to capture light projected onto a surface of the photosensor; and
a folded lens system configured to refract light from an object field located in front of the camera to form an image of a scene at an image plane proximate to the surface of the photosensor, wherein the lens system comprises five refractive lens elements arranged along a folded optical axis of the lens system from an object side to an image side and a light folding element configured to redirect light from a first lens element on the object side to a second portion of the folded optical axis, and wherein a second lens element of the five refractive lens elements in order along the folded optical axis from the object side to the image side has a concave image-side surface in a paraxial region of the second lens element;
wherein the light folding element is a prism, wherein an image side surface of the first lens element is flat/plano in a paraxial region of the first lens element, and wherein the image side surface of the first lens element is in contact with an object side surface of the prism.

20. The device as recited in claim 19, wherein the folded lens system provides a 35 mm equivalent focal length in the range of 50-85 mm and less than 6.5 mm of Z-height measured from a front vertex of the lens system to a rear vertex of the folding element.

* * * * *